United States Patent [19]

Müller et al.

[11] Patent Number: 4,862,951
[45] Date of Patent: Sep. 5, 1989

[54] APPARATUS, FOR MOTOR VEHICLES HAVING A LIQUID-COOLED ENGINE, FOR HEATING WINDSHIELD WASHER LIQUID OR THE LIKE

[75] Inventors: Fritz Müller, Stentenbergstr. 31, 5275 Bergneustadt; Anton Lohrum, Hagen, both of Fed. Rep. of Germany

[73] Assignee: Fritz Müller, Bergneustadt, Fed. Rep. of Germany

[21] Appl. No.: 134,935

[22] Filed: Dec. 18, 1987

[30] Foreign Application Priority Data

Dec. 18, 1986 [DE] Fed. Rep. of Germany ....... 3643245
Nov. 3, 1987 [DE] Fed. Rep. of Germany ....... 3737241

[51] Int. Cl.$^4$ .............................. F28D 7/02; B60S 1/46; B60S 1/48
[52] U.S. Cl. ........................ 165/41; 165/51; 165/76; 165/163; 123/557; 239/129; 239/130; 237/12.3 R
[58] Field of Search ............... 165/41, 51, 52, 76, 165/163; 219/208; 239/129, 130; 123/557

[56] References Cited

U.S. PATENT DOCUMENTS

| | | | |
|---|---|---|---|
| 1,785,159 | 12/1930 | Ullman | 165/163 |
| 1,853,585 | 4/1932 | Sutter | 165/51 |
| 1,893,484 | 1/1933 | Belt | 165/163 |
| 2,456,564 | 12/1948 | Muller | 165/163 |
| 2,537,678 | 1/1951 | Koetting | 165/76 |
| 2,663,548 | 12/1953 | Boling | 165/76 |
| 3,828,847 | 8/1974 | Stein | 165/76 |
| 4,397,288 | 8/1983 | Kelling | 165/51 |

FOREIGN PATENT DOCUMENTS

| | | | |
|---|---|---|---|
| 2112473 | 10/1972 | Fed. Rep. of Germany. | |
| 2745791 | 4/1979 | Fed. Rep. of Germany | 165/51 |
| 3232371 | 3/1984 | Fed. Rep. of Germany. | |
| 8605578 | 9/1986 | World Int. Prop. O. | 165/163 |

Primary Examiner—John Ford
Attorney, Agent, or Firm—Becker & Becker, Inc.

[57] ABSTRACT

An apparatus, for a motor vehicle having a liquid-cooled engine, for heating windshield washer liquid or the like. The apparatus includes a cylindrical heat-exchanger housing that, via hose connectors that are disposed at both ends of the housing, can be disposed directly in the coolant line between the engine and a radiator, with the interior of the housing, through which the coolant flows, containing a tube coil that is helically wound in the longitudinal direction of the housing. Liquid that is to be heated flows through the tube coil, and the ends of the latter are conveyed out of the housing in a radial direction. The housing is divided, in an axial direction, into two semicylindrical shells which have abutting longitudinal edges that can be sealingly interconnected. The tube coil is adapted to be placed between the shells, and the housing is provided on the periphery of at least one of the shells with two radially extending pass-through sleeves through which respective ones of the radially extending tube coil ends can extend. Each pass-through sleeve has an outer end that is remote from the housing and on which a sealing ring and a coupling nut is disposed to seal the tube coil end in the pass-through sleeve.

8 Claims, 1 Drawing Sheet

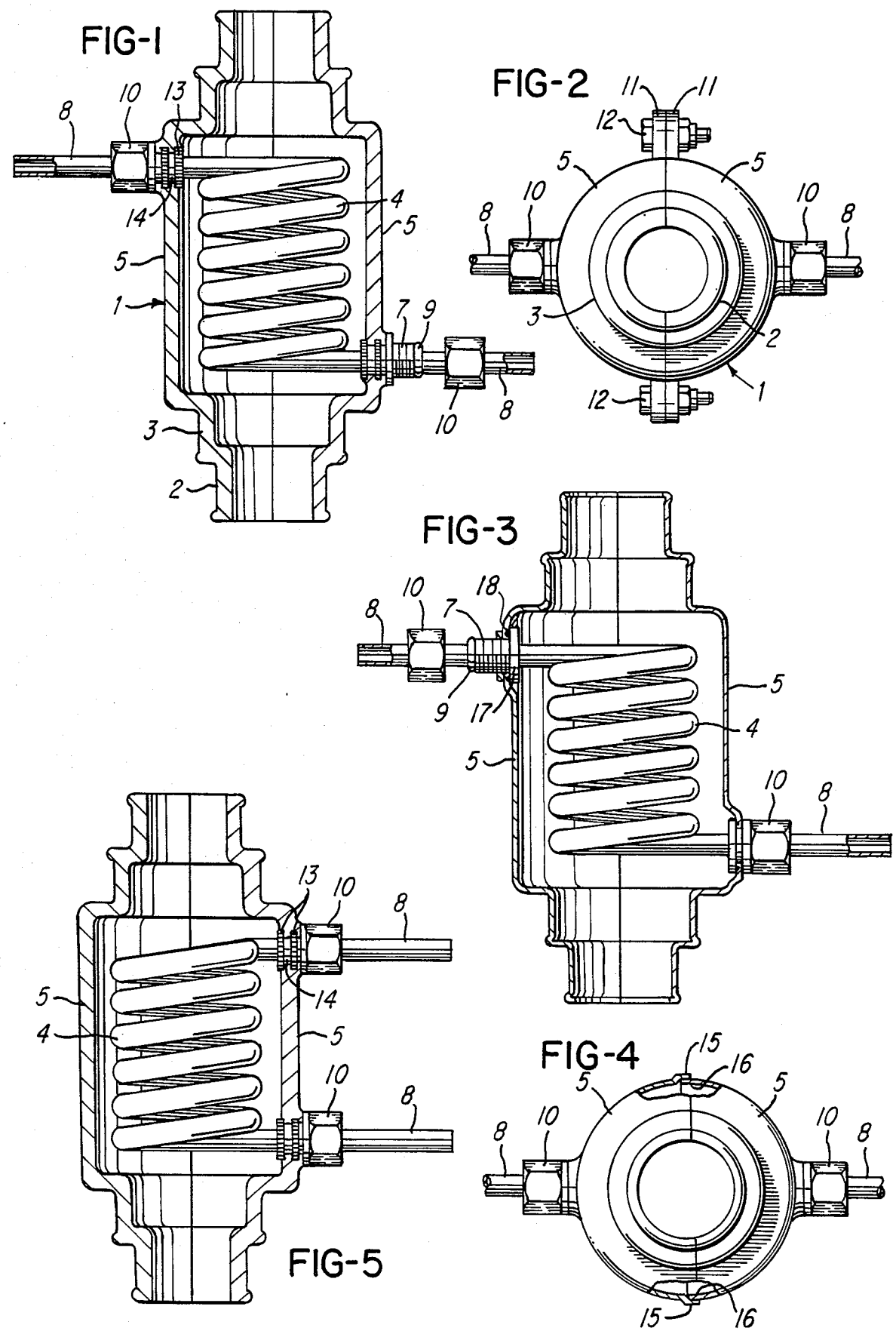

APPARATUS, FOR MOTOR VEHICLES HAVING A LIQUID-COOLED ENGINE, FOR HEATING WINDSHIELD WASHER LIQUID OR THE LIKE

BACKGROUND OF THE INVENTION

The present invention relates to an apparatus, for a motor vehicle having a liquid-cooled engine, for heating windshield washer liquid or the like. The apparatus includes a cylindrical heat-exchanger housing that, via hose connectors that are disposed at both ends of the housing, can be disposed directly in the coolant line between the engine and a radiator, with the interior of the housing, through which the coolant flows, containing a tube coil that is helically wound in the longitudinal direction of the housing. The liquid that is to be heated flows through the tube coil, and the ends of the latter are conveyed out of the housing in a radial direction.

Various apparatus are known for motor vehicles in order to be able to utilize the heat that is released by the engine and is to be withdrawn by the cooling water of the radiator in a heat exchanger for generating warm windshield washer liquid. German Pat. No. 32 32 371, Gercken dated May 21, 1987, discloses a heatable windshield washer apparatus, the heat exchanger of which is disposed in the cooling water hose circuit and comprises a tubular housing through which the cooling water flows. Disposed coaxially in this housing is a double-walled tube, the hollow space of which forms the heat-exchanger channel for the wash liquid. The two connector fittings that are connected to the wash-liquid line and that lead to the hollow space of the double-walled tube project radially from this tube and extend through the wall of the housing. With such a heat-exchanger configuration, the double-walled tube can be placed axially in the tubular housing only without the connector fittings, and the latter can be inserted through the wall of the housing only after the double-walled tube is placed in the housing, whereupon the connector fittings must be connected to the double-walled tube in the housing. This requires a complicated and expensive manufacturing procedure. German Offenlegungsschrift 21 12 473, Nitterl et al dated Oct. 5, 1972, corresponding to U.S. Pat. No. 3,756,510, Nitterl et al, dated Sept. 4, 1973, discloses a heat exchanger for a heatable windshield washer apparatus, the tubular housing of which, through which cooling water flows, being closed off at the ends by end caps that are placed thereon and that contain hose connectors. A tube coil that is helically wound in the longitudinal direction of the housing is disposed in the latter as a heat-exchanger channel for the wash liquid. The connection ends of the tube coil for the wash liquid line project out through openings of the tubular housing or of the end caps; in particular, at one heat-exchanger end, a connection end projects out radially, and at the other heat-exchanger end, a connection end projects out at an inclined angle to the longitudinal axis of the housing. The tube coil can be installed in the housing only if the connection end that is inclined at an angle is first directed axially, so that when the tube coil is introduced into the tubular housing with this connection end in front, it can pass through the tubular housing. After the tube coil has been placed in the tubular housing, this connection end is then bent into the desired or required inclined position. Such a procedure can, of course, lead to damage of the material of the tube coil. This heretofore known heat-exchanger configuration additionally requires significant manufacturing effort in order to sealingly and securely connect the end caps to the tubular housing, for example by sealingly welding the abutting or overlapping edges of the sheet-metal housing and the cap all the way around. Significant manufacturing effort is also required in order to reliably seal the connection ends of the tube coil in the pass-through openings of the tubular housing or of the end caps to prevent cooling water from escaping from the heat exchanger; this can be accomplished, for example, by soldering a copper tube coil into the passthrough openings of the tubular sheet-metal housing and the caps.

It is an object of the present invention to provide an apparatus of the aforementioned general type that can be assembled in an easier, quicker, and more economical manner, of prefabricated individual components, than was possible with the aforementioned known types of heat exchangers, and that, especially at those locations where the connection ends of the tube coil are conveyed out of the heat-exchanger housing, and even at possible increased pressures in the cooling liquid circuit, assures a seal that reliably precludes loss of cooling water, which would, of course, be dangerous for the engine.

BRIEF DESCRIPTION OF THE DRAWINGS

This object, and other objects and advantages of the present invention, will appear more clearly from the following specification in conjunction with the accompanying schematic drawings, in which:

FIG. 1 is a longitudinal cross-sectional view through a first exemplary embodiment of the inventive apparatus;

FIG. 2 is an end view of the apparatus of FIG. 1;

FIG. 3 is a longitudinal cross-sectional view through a second exemplary embodiment of the inventive apparatus; and FIG. 4 is a partially cross-sectioned end view of the apparatus of FIG. 3.

FIG. 5 shows a longitudinal cross-sectional view similar to FIG. 1.

SUMMARY OF THE INVENTION

The apparatus of the present invention is characterized primarily in that the housing is divided, in an axial direction, into two semicylindrical shells which have abutting longitudinal edges that can be sealingly interconnected; the tube coil is adapted to be placed between these shells, and the housing is provided on its periphery with two radially extending pass-through sleeves through which respective ones of the radially extending ends of the tube coil can extend; each pass-through sleeve has an outer end that is remote from the housing and on which a sealing ring and a coupling nut is disposed to seal the tube coil end in the pass-through sleeve. The two pass-through sleeves either can be disposed on the periphery of one of the shells and can be directed in the same radial direction as shown in FIG. 5, or they can be disposed on the peripheries of both shells and can be directed in opposite radial directions as shown in FIG. 1.

Further specific features of the present invention will be described in detail subsequently.

DESCRIPTION OF PREFERRED EMBODIMENTS

Referring now to the drawings in detail, the cylindrical heat-exchanger housing 1 of the illustrated apparatus is provided at both ends of the housing with hose connectors 2 in order to be able to place the apparatus directly in the coolant line between a liquid-cooled engine and a radiator, especially of motor vehicle, so that the coolant can flow directly through the apparatus. The two ends of the housing 1 are advantageously provided with stepped connectors 2, 3 in order to be able to use the coolant hoses that have different diameters and that are customary in the motor vehicle industry, with these hoses then being clamped in position via hose clamps. Disposed in the housing 1 is a tube coil 4 that is helically wound in the longitudinal direction of the housing. The winding of the coil 4 are spaced from one another, so that the coolant can intensively flow all around the windings of the coil 4, and these coils can intensively absorb heat from the coolant in order to be able to heat up a liquid, such as the wash water for the windshield washer unit of a motor vehicle, that flows through the tube coil 4. The inventive apparatus can also be very advantageously used in order, without additional consumption of energy, to be able to use the already constantly available heat of the engine cooling-water to continuously preheat the diesel fuel for a diesel engine to such an extent that the diesel fuel, especially during the cold times of the year, remains optimally able to flow and atomize, and in so doing can be burned in the diesel engine in an economical fuel-saving manner with few environmentally polluting particulates.

In the axial direction, the housing 1 is divided into two semicylindrical shells 5 that can be tightly and sealingly connected to one another along their abutting longitudinal edges. The housing 1 is also provided with two radially extending pass-through sleeves 7 through which can be guided the radially directed connection ends 8 of the tube coil 4. In the illustrated embodiments, the two pass-through sleeves 7, just like the ends 8 of the tube coil 4, are directed in oppositely directed radial directions, with the pass-through sleeves 7 being disposed on the peripheries of the two housing shells 5. The ends 8 of the tube coil 4 could also be directed in the same radial direction, in which case the two pass-through sleeves 7, of course, also would be directed in the same radial direction and would be disposed on the periphery of only one of the shells 5. O-ring seals 9, and thereafter coupling nuts 10, are placed on the tube coil ends 8 that extend through the pass-through sleeves 7. The coupling nuts 10 can be screwed onto the outer ends of the sleeves 7, and together with the O-rings 9 seal the tube coil ends 8 in the pass-through sleeves 7 so that coolant does not leak out. By axially splitting the housing 1 into the two semicylindrical shells 5, and by forming the housing pass-throughs for the tube coil from the pass-through sleeves 7, the tube coil 4 can during assembly of the apparatus easily be placed between the two housing shells and in so doing the radial connection ends 8 of the tube coil 4 can easily be inserted through the pass-through sleeves 7 and can then be satisfactorily and reliably sealed therein, via the O-rings 9 and the coupling nuts 10, in a simple and rapid assembly step.

In the embodiment illustrated in FIGS. 1 and 2, the housing is made of cast or injection molded material, such as plastic. The housing is preferably made of an aluminum casting, such as could, for example, also be used for the cylinder heads. Such a housing has the advantage that the two semicylindrical shells thereof have a high stability and strength even at high temperatures, and that the longitudinal edges of the shells can be clamped or pressed together in a satisfactorily sealed manner. For this purpose, the two housing shells 5 are provided along their longitudinal edges with outwardly projecting flanges 11 via which the shells 5, along with an interposed seal insert between their longitudinal edges, can be tightly clamped together by means of clamping bolts 12. By making the housing of injection moldable or castable material, especially an aluminum casting, it is possible to simultaneously cast the pass-through sleeves 7 into the walls of the shells in a sealed, nonrotatable, and longitudinally fixed manner during the manufacture of the shells 5 themselves. So that the pass-through sleeves 7, for example when the coupling nuts 10 are screwed thereon, do not turn or shift longitudinally in the shell wall, and hence lose their seal in the shell wall, those ends of the sleeves 7 that are cast into the shell wall can be provided, for example, with a peripheral knurling 13 that prevents rotation, and with an annular-groove-like reduced-diameter section 14 that prevents longitudinal shifting.

In the embodiment illustrated in FIGS. 3 and 4, the two semicylindrical housing shells 5 are made of sheet metal. The longitudinal edges 15 of one of the housing shells 5 are offset in the radial direction (in the illustrated embodiment in an outer radial direction) and overlap the longitudinal edges 16 of the other shell 5. Where the longitudinal edges 15, 16 overlap, the two housing shells 5 are tightly and securely interconnected after the tube coil 4 has been easily installed in the manner described in connection with the embodiment of FIGS. 1 and 2. This interconnection can be effected by means of an adhesive or via a soldering material, with both of these methods being well known in the metal-connecting industry. The overlapping longitudinal edges 15, 16 of the housing shells 5 can be fitted into one another to such an extent that the longitudinal edges 16 abut against the bends of the radially offset longitudinal edges 15, as a result of which the overlap gap between the longitudinal edges 15 and 16 is adequately closed off in the direction toward the interior of the housing so that liquid solder material cannot flow through into the interior of the housing. The pass-through sleeves 7, preferably from the interior side of the housing, are passed through holes in the sheet-metal wall of the housing shells 5, and flange-like securing shoulders 17 that are formed on the pass-through sleeves 7 rest against the inner side of the sheet-metal wall. Securement of the pass-through sleeves 7 can be effected by a lock nut that is screwed on and rests against the outer side of the sheet-metal wall. To seal a given pass-through sleeve 7 in the hole in the sheet-metal wall, a washer or other sealing member can be provided between the securing shoulder 17 and the sheet-metal wall. The sealed securement of a pass-through sleeve 7 against the sheet-metal wall of the housing shell 5 can advantageously be effected in a mechanical manufacturing by providing the securing shoulder 17 with a bead 18 that extends around the pass-through sleeve 7 in an annular manner, and via which the securing shoulder 17 contacts the sheet-metal wall. It is then at the location of this bead 18 that the securing shoulder 17 is sealingly and tightly connected to the sheet-metal wall via an induction weld.

The present invention is, of course, in no way restricted to the specific disclosure of the specification and drawings, but also encompasses any modifications within the scope of the appended claims.

What we claim is:

1. In an apparatus, for a motor vehicle having a liquid-cooled engine, for heating windshield washer liquid, said apparatus including a cylindrical heat-exchanger housing that, via hose connectors that are disposed at both ends of the housing, is disposed directly in the coolant line between the engine and a radiator, with the interior of said housing, through which the coolant flows, containing a tube coil that is helically wound in the longitudinal direction of said housing, with liquid that is to be heated flowing through said tube coil, and with the ends of said tube coil being conveyed out of said housing in a radial direction, the improvement wherein:

said housing is divided, in an axial direction, into two semicylindrical shells which have abutting longitudinal edges that are sealingly interconnected; said tube coil is adapted to be placed between said shells, and said housing is provided on its periphery with two radially extending pass-through sleeves through which respective ones of said radially extending ends of said tube coil can extend; each of said pass-through sleeves has an outer end that is remote from said housing and on which a sealing ring and a coupling nut are disposed to seal a given end of said tube coil in said pass-through sleeve, said housing being made of predetermined material, and said longitudinal edges of said housing shells are provided with outwardly projecting flanges via which, along with the interposition of a sealing insert between said longitudinal edges, said shells being interconnected; said pass-through sleeves being sealingly cast into said housing, and including means to preclude any rotation and shifting in a longitudinal direction.

2. An apparatus according to claim 1, in which said housing shells are aluminum castings.

3. An apparatus according to claim 1, in which said housing shells are interconnected at said flanges via bolts.

4. An apparatus according to claim 1, in which both of said pass-through sleeves are disposed on the periphery of a single one of said shells and extend in essentially the same radial direction.

5. An apparatus according to claim 1, in which each of said pass-through sleeves is disposed on the periphery of a different one of said shells, with said sleeves extending in opposite radial directions.

6. An apparatus according to claim 1, in which said hose connectors on said ends of said housing are stepped connectors to accommodate coolant hoses of varying diameters.

7. An apparatus according to claim 1, in which said housing is made of cast material.

8. An apparatus according to claim 1, in which said housing is made of injection-molded plastic material.

* * * * *